Patented Apr. 12, 1949

2,467,330

UNITED STATES PATENT OFFICE 2,467,330

PREPARATION OF DERIVATIVES OF ALIPHATIC TERPENES

Nicholas A. Milas, Belmont, Mass., assignor to Union Bay State Chemical Co., Inc., Cambridge, Mass., a corporation of Massachusetts No Drawing. Application June 17, 1944, Serial No. 540,895

8 Claims. (Cl. 260—631.5)

This invention relates to a process of treating aliphatic terpenes to produce linalool, geraniol, and derivatives thereof, and its principal object is to provide an efficient and reliable process of producing such products in commercially satisfactory yields.

It has long been known that the treatment of myrcene and other aliphatic terpenes with sulphuric acid, acetic acid, etc., produces, among other things, small amounts of linalool, as will appear by reference to Power and Kleber [Phar. Rundschau, 13, 60 (1895)]; Barbier [Bull. soc. chim., 25 687 (1901)]; Semler et al., [Ber., 34, 3126 (1901); 44, 2011 (1911)], Enklaar [Rec. trav. chim., 26 157 (1907)], and Chapman [J. Chem. Soc., 83, 506 (1903)]. Such procedures have been found to be impracticable for the industrial production of linalool and related products due to low yields and the production of polyhydrated products, polymers and various resinous by-products. Moreover, in all such procedures the treatment of the aliphatic terpene is carried out in the presence of air or in an oxidizing atmosphere which, according to Borglin (U. S. P., 2,312,684 and 2,321,978), leads to polyaddition products, many of which are soluble in water and have no value as perfumes.

I have found that when myrcene and the like aliphatic terpenes are subjected to a catalytic partial selective hydration, in the absence of air or other oxidizing influence, linalool and/or geraniol and their derivatives are produced in relatively high yields with the virtual elimination of resinous by-products; and that these products may readily be recovered by suitable extraction and/or distillation procedures so as to obtain the alcohols, esters and/or ethers in relatively pure or concentrated state, suitable for use in the manufacture of perfumes and perfumed products.

In accordance with the present invention an aliphatic terpene such as myrcene, ocimene and alloöcimene is incorporated or dissolved in a mixture comprising a relatively stable, normally liquid volatile non-benzenoid organic solvent containing a carboxyl, hydroxyl, ether or ester group and which is at least partially miscible with water, an acid catalyst and an inhibitor or antioxidant, and the mixture is then heated, with or without agitation, in an atmosphere free from oxygen or other oxidizing influences to a temperature lower than the boiling point of the solvent for a period from two to twenty-four hours or more, depending upon the catalyst and solvent employed. The reaction which takes place in essentially a catalytic partial selective hydration of the terpene, resulting in the production of unsaturated alcohols, esters and/or ethers, which may be recovered by distillation as hereinafter described.

The solvent may comprise an organic acid, such as one or more of the mono-carboxylic aliphatic acids, e. g., acetic acid, an alcohol, such as one or more of the mono-aliphatic alcohols, and aliphatic ester or ether, an alcohol-ether or a mixture of such solvents. In any case, the solvent should be normally liquid, relatively stable, at least part'y miscible with water and capable of being distilled without undergoing appreciable decomposition. In cases in which the products to be obtained are alcohols such as linalool, geraniol, etc., water is incorporated with the solvent in an amount not to exceed one and one-half times the theoretical amount necessary for the production of these alcohols.

When organic acids are used as solvents, the alcohols produced are partially esterified; and when alcohols are used as solvents, the alcohols are partially etherified. On the other hand, when anhydrous conditions are employed with organic acids as solvents, esters are the predominant products, although alcohols are also formed, probably as the result of hydrolysis of the esters. With alcohols, in the absence of water, the ether of linalool and/or geraniol are the predominant products. Hence, the particular type of product is governed by the selection of the solvent or solvent mixture.

The catalyst may comprise any of the well known organic and inorganic acids, acid salts or esters, such, for example, as benzene sulfonic acid, p-toluene sulfonic acid, glyoxal sulfate, dioxane sulfate, sulfuric acid, hydrogen fluoride, boron trifluoride, boron trifluoride-etherate, borofluoric acid, perchloric acid, zinc chloride, aluminum chloride, antimony trichloride, etc., in an amount varying from 1 to 10% or more, based on the weight of the aliphatic terpene, although practical working limits are between 2% and 5%.

Any of the well known phenolic anti-oxidants or oxidation inhibitors which are soluble in or miscible with the reaction mixture may be employed, e. g., hydroquinone, catechol, substituted phenols, naphthols and the like, in an amount which need not exceed 1%, practical working limits being from 0.1% to 1%.

In order to maintain a non-oxidizing atmosphere the reaction is preferably carried out in an enclosed vessel, equipped with an agitator and valved inlet and outlet ducts so arranged that the air within the vessel may be displaced with carbon dioxide, nitrogen, or other non-oxidizing relatively inert gases. The operating temperatures are governed by the characteristics of the selected solvent, and as a general rule should be lower than the boiling point of the solvent at the operating pressure. A temperature range from 30° to 80° C. is generally satisfactory when operating at atmospheric pressure, the preferred range being from 40° C. to 50° C.

The reactions may be illustrated by the following equations:

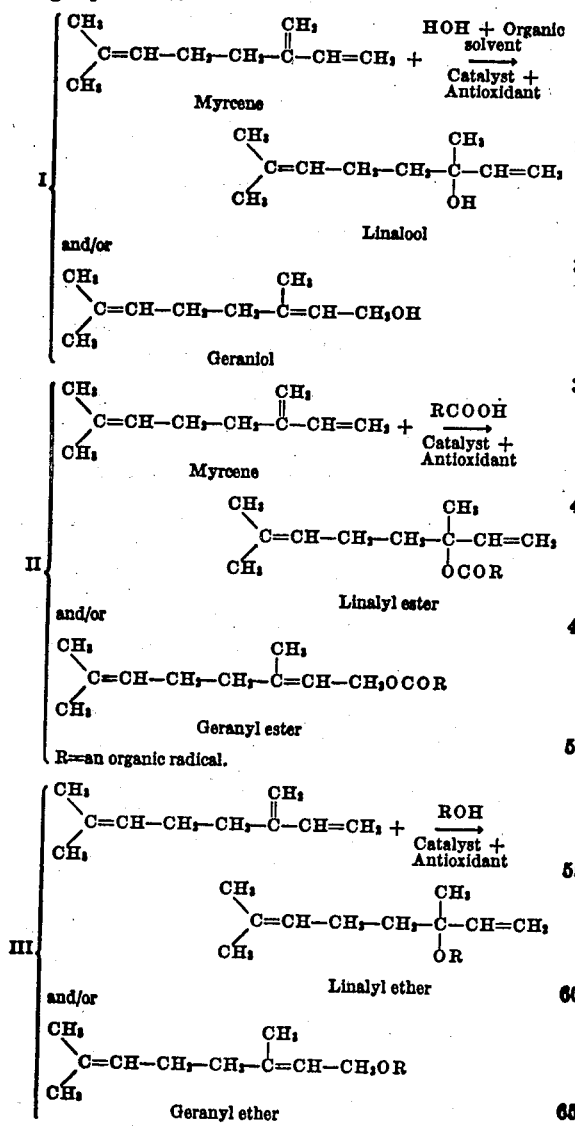

R=an organic radical.

To recover the desired products from the final mixture with the minimum loss due to polymerization or decomposition the following methods have been successfully employed: (1) The solvent from the final mixture is removed under reduced pressure and the products fractionated under a highly reduced pressure, then protected from further deterioration by the addition of small amounts of antioxidants such as aromatic amines, polyhydric phenols, naphthols and the like, especially those related to perfumes; (2) the desired products can be recovered from the final mixtures more advantageously by steam distillation in the presence of antioxidants, such as polyhydric phenols, naphthols and the like.

If it is desired to separate the alcohols from the ester and/or ethers, the mixture is heated with an equivalent weight of boric acid or boric anhydride to form with the alcohol the boric acid ester which is relatively non-volatile and the organic esters or ethers could be removed from it by high vacuum distillation. To recover the alcohols from their boric acid esters, the latter are treated with alkali and the alcohol formed distilled with steam.

Specific examples illustrative of my process are as follows:

EXAMPLE 1

Myrcene (45 g.; 0.330 mols.), glacial acetic acid (142 g.; 2.5 mols.), water (6.1 g.; 0.339 mols.), p-toluene sulfonic acid (3 g.; 0.018 mols.) and hydroquinone (0.5 g.; 0.004 mols.) were mixed in a flask equipped with a stirrer, an inlet and an outlet to allow carbon dioxide or some other inert gas to pass over the liquid. Although stirring is not absolutely essential since the mixture is completely homogeneous, the mixture was nevertheless stirred for 7.5 hours at a temperature between 45°–50° C., while carbon dioxide was constantly passing over the surface of the mixture. At the end of this period, the mixture was diluted with 200 cc. of water and the non-aqueous layer separated, extracted with sodium bicarbonate solution to remove the acidic constituents then dried over anhydrous magnesium sulfate. A yield of 45 g. of a very pleasant smelling neutral product was obtained which contained 23% ester determined by saponification and 45% alcohol estimated by Zerewitinoff.

This product was heated with boric anhydride at 90°–100° for about 3 hours, then the unreacted ester removed under reduced pressure. The highly viscous boric ester residue was warmed on the water bath with excess concentrated sodium carbonate solution and the alcohol liberated distilled with steam or, if desired, extracted with ether and fractionated under reduced pressure. The pure linalool obtained from this process was found to have a boiling point at 55°–56° C. (3 mm.); $n_D^{25°}$, 1.4680; $d^{25°}_{4°}$, 0.871; active hydrogen (Zerewitinoff), 1.098 (calcd., 1.00); unsaturation (catalytic hydrogenation), 1.88 (calcd., 2.00). It contained no saponifiable ester. Its odor was much sweeter and more pleasant than Bois der Rose, a natural perfume imported from Brazil.

The acetate was found to have a boiling point of 60°–61° (3mm.); $n_D^{25°}$, 1.4560; $d^{25°}_{4°}$, 0.925; sapon. number, 204 (calcd., 196). The acetate also had a very pleasant odor reminiscent of linalyl acetate.

Table 1 describes additional examples in which myrcene (0.330 mols.), water (0.339 mols.) and the inhibitor (hydroquinone, 0.004 mols.) were kept constant using various catalysts with acetic acid as the solvent. The procedure was identical to that used under Example 1 except in the case in which the catalyst was hydrofluoric acid. In this case (Ex. 11) the reaction was carried out in a sealed steel bomb at 50° C. The results indicate definitely that in all of the examples both the unsaturated alcohols and esters were produced.

TABLE I

*Catalytic Partial Hydration of Myrcene*

| Example | Catalyst, in mols | Acetic Acid | Ester Formed | Alcohol Formed | Total |
|---|---|---|---|---|---|
| | | Mols | Percent | Percent | Percent |
| 2 | Benzenesulfonic acid 0.0190 | 2.5 | 25 | 38 | 63 |
| 3 | Potassium bisulfate, 0.221 | 2.6 | 10 | 14 | 24 |
| 4 | Perchloric acid (60%), 0.0180 | 2.8 | 9 | 21 | 30 |
| 5 | Zinc chloride, 0.0221 | 3.1 | 6 | 15 | 21 |
| 6 | Glyoxal sulfate, 0.0192 | 2.3 | 25 | 42 | 67 |
| 7 | Dioxan sulfate, 0.0161 | 2.5 | 20 | 34 | 54 |
| 8 | Cuprous chloride (0.030), hydrochloric acid (12N; 0.01) | 2.7 | 9 | 23 | 32 |
| 9 | Sulfuric acid, 0.020 | 3.0 | 21 | 39 | 60 |
| 10 | Antimony trichloride, 0.0132 | 2.7 | 0 | 15 | 15 |
| 11 | Hydrofluoric acid (47%), 0.075 | 3.3 | 1 | 9 | 10 |
| 12 | Trichloroacetic acid, 0.0184 | 3.0 | 4 | 11 | 15 |

In Table II are given three additional examples following exactly the same procedure as that described under Example 1 except that formic, propionic, and n-butyric acids, respectively, were used instead of acetic acid. In every case linalool was formed together with the ester of this alcohol corresponding to the acid used.

TABLE II

*Catalytic partial hydration of myrcene in the presence of various organic acids*

| Example | Catalyst (p-toluene sulfonic acid) | Acid, in mols | B. pt. (°C., 3 mm.) | $n_D$ | Ester formed | Alc. formed | Total |
|---|---|---|---|---|---|---|---|
| | Mols | | | | Per cent | Per cent | Per cent |
| 13 | 0.12 | Formic (85%), 0.60 | 55°–65° | 1.4680 (25°) | 63 | [1] 54 | [1] 117 |
| 14 | 0.12 | Propionic, 0.53 | 65°–95° | 1.4669 (25°) | 26 | 67 | 93 |
| 15 | 0.12 | Butyric, 0.53 | 80°–85° | 1.4604 (26°) | 35 | 41 | 76 |

[1] It is well known in the case of formates, the Zerewitinoff determination gives high values.

EXAMPLE 16

In this and subsequent examples, the addition of alcohols to myrcene was effected in the presence of various catalysts. The catalyst in this case was prepared by gently warming with stirring a mixture of 2 cc. of boron trifluoride-etherate complex, 2 cc. anhydrous methyl alcohol and 2 g. of mercuric oxide until the mixture turned grey. To this mixture was then added slowly while stirring and in the presence of an inert atmosphere such as nitrogen, a mixture of 40 g. myrcene and 10 g. of anhydrous methanol. The mixture was then refluxed in the water bath for one hour, then cooled and neutralized with anhydrous sodium carbonate. It was then decanted and the excess methanol removed under reduced pressure and the residue fractionated. The product boiling at 54°–59° (3 mm.) was collected and analyzed. This had an $n_D^{25°}$, 1.4588. A methoxyl determination indicated the presence of 82.7% methyl ether of linalool, and a Zerewitinoff determination indicated the presence of 10.9% of linalool.

EXAMPLE 17

A mixture of 25 g. of 95% methyl alcohol and 6 g. of concentrated sulfuric acid was slowly added in the presence of an inert atmosphere and with stirring into 40 g. of myrcene in the course of one-half hour. The mixture was then heated to 50°–60° C. for two hours, then cooled to room temperature, poured in cold water and neutralized with sodium bicarbonate. The organic layer was extracted with ether and fractionally distilled and the fraction boiling at 52°–53° (3 mm.) collected and analyzed. This fraction had an $n_D^{24.5}$, 1.4599 and a methoxyl content of 14.27% compared with a value of 18.45% for the pure methyl ether of linalool.

EXAMPLE 18

A mixture of 40 g. of myrcene, 30 g. 95% ethyl alcohol and 3 g. concentrated sulfuric acid was heated at 50°–75° C. for three hours, then cooled, poured in cold water and neutralized with sodium bicarbonate. The organic layer was extracted with ether and fractionated under reduced pressure and the fraction boiling 63°–66° (2–3 mm.) collected and analyzed. This fraction had a $d^{25°}_{4°}$ 0.860; an $n_D^{24°}$, 1.4590; an alcoholic content (linalool), 38% (Zerewitinoff); and an ethoxy content of 23%.

EXAMPLE 19

A mixture of 40 g. of myrcene, 30 g. of 95% ethyl alcohol and 3 g. of dioxane sulfate was heated in an inert atmosphere at 50°–70° C. for three hours, then cooled, poured in cold water and neutralized with sodium bicarbonate. The organic layer was then extracted with ether and fractionated under reduced pressure and the fraction (14%) boiling at 55°–72° (2–3 mm.) collected.

EXAMPLE 20

A mixture of 40 g. myrcene, 49 g. of 95% isobutyl alcohol and 6 g. concentrated sulfuric acid was heated in an inert atmosphere at 60° C. for two hours, then cooled, poured in cold water and neutralized with sodium bicarbonate. The organic layer was extracted with ether and fractionated under reduced pressure and the fraction (25%) boiling at 65°–82° (2–3 mm.) collected.

EXAMPLE 21

A mixture of 40 g. of myrcene, 45 g. β-phenylethyl alcohol, 2 g. water and 6 g. of concentrated sulfuric acid was heated in an inert atmosphere at 60° C. for one-half hour, then cooled, poured in cold water and neutralized with sodium bicarbonate. The organic layer was extracted with ether and fractionated under reduced pressure and the fraction (40%) boiling at 140°–150° (2–3 mm.) collected. This had an $n_D^{23°}$, 1.5110.

When the foregoing Examples 16 to 21 were repeated under the same conditions, using the order of 0.01 mol of phenolic anti-oxidant per mol of myrcene, greatly increased yields of linalool and derivatives thereof were obtained.

I claim:

1. The process of producing unsaturated aliphatic terpene derivatives of the class described, which comprises reacting a mixture of an aliphatic terpene of the group consisting of myrcene, ocimene and alloöcimene and a normally liquid volatile organic solvent selected from the group consisting of the non-benzenoid monocarboxylic acids, aliphatic alcohols, esters, ethers, alcohol-ethers and mixtures thereof, in an atmosphere free from oxygen in the presence of a catalyst and a phenolic antioxidant.

2. The process of producing unsaturated aliphatic terpene derivatives of the class described, which comprises reacting a mixture of an aliphatic terpene of the group consisting of myrcene, ocimene and alloöcimene, water in an amount not exceeding one and one-half times the theoretical amount necessary for the production of the tertiary alcohol corresponding to the selected terpene and a normally liquid volatile organic solvent selected from the group consisting of the non-benzenoid mono-carbocylic acids, aliphatic alcohols, esters, ethers, alcohol-ethers and mixtures thereof, in an atmosphere free from oxygen in the presence of an acid catalyst and a phenolic antioxidant.

3. The process of producing linalool and related unsaturated derivatives thereof, which comprises reacting a mixture of myrcene and a normally liquid volatile organic solvent selected from the group consisting of the non-benzenoid monocarbocyclic acids, the aliphatic alcohols, esters, ethers, alcohol-ethers, and mixtures thereof, in an atmosphere free from oxygen in the presence of from 1 to 10% of an acid catalyst and from 0.1 to 1% of a phenolic antioxidant.

4. The process of producing linalool and related unsaturated derivatives thereof, which comprises reacting a mixture of myrcene, water in an amount not exceeding one and one-half times the theoretical amount necessary for the production of the unsaturated alcohol, and a normally liquid volatile organic solvent selected from the group consisting of the non-benzenoid monocarboxylic acids, aliphatic alcohols, esters, ethers, alcohol-ethers and mixtures thereof in an inert atmophere, in the presence of 1% to 10% of an acid catalyst and from 0.1 to 1% of a phenolic antioxidant at a temperature between 40° and 80° C.

5. The process of producing linalool and related unsaturated derivatives thereof, which comprises reacting a mixture of myrcene and normally liquid volatile aliphatic acid in an atmosphere free from oxygen in the presence of from 2 to 5% of an acid catalyst and from 0.1 to 1% of a phenolic antioxidant at a temperature between 40° and 80° C.

6. The process of producing linalool and related unsaturated derivatives thereof, which comprises reacting a mixture of myrcene and a normally liquid aliphatic, monohydric alcohol in an atmosphere free from oxygen in the presence of from 2% to 5% of an acid catalyst and from 0.1% to 1% of a phenolic antioxidant.

7. The process of producing linalool and related unsaturated derivatives thereof, which comprises reacting a mixture of myrcene and acetic acid in an atmosphere free from oxygen in the presence of 1% to 10% of p-toluene sulfonic acid and from 0.1% to 1% of hydroquinone.

8. The process of producing linalool and related unsaturated derivatives thereof, which comprises reacting a mixture of myrcene and ethanol in an atmosphere free from oxygen in the presence of 1% to 10% of p-toluene sulfonic acid and from 0.1% to 1% of hydroquinone.

NICHOLAS A. MILAS.

REFERENCES CITED

The following references are of record in the file of this patent:

UNITED STATES PATENTS

| Number | Name | Date |
| --- | --- | --- |
| 1,950,438 | Carothers | Mar. 13, 1934 |
| 2,178,349 | Sheffield | Oct. 31, 1939 |
| 2,285,366 | Sheffield | June 2, 1942 |

FOREIGN PATENTS

| Number | Country | Date |
| --- | --- | --- |
| 92,122 | Switzerland | Dec. 16, 1921 |
| 92,123 | Switzerland | Dec. 16, 1921 |

OTHER REFERENCES

Moureau et al., "Comptes Rendues," vol. 183, pages 408–412 (1926).

Heuster, "The Chemistry of the Terpenes," pages 377–8.